United States Patent
Zarco (10) Patent No.: US 7,249,353 B2
(45) Date of Patent: Jul. 24, 2007

(54) IMAGE-FORMATION DEVICE FIRMWARE HAVING MODULAR UPGRADE CAPABILITY

(75) Inventor: Maria F. Zarco, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 562 days.

(21) Appl. No.: 10/420,038

(22) Filed: Apr. 17, 2003

(65) Prior Publication Data

US 2004/0210894 A1  Oct. 21, 2004

(51) Int. Cl.
G06F 9/44 (2006.01)
(52) U.S. Cl. .................. 717/171; 717/170; 717/176
(58) Field of Classification Search .............. None
See application file for complete search history.

(56) References Cited

U.S. PATENT DOCUMENTS 4,079,452 A  3/1978  Larson et al.
6,357,021 B1 *  3/2002  Kitagawa et al. ............. 714/41
6,930,785 B1 *  8/2005  Weyand et al. ............. 358/1.1
2002/0046265 A1 *  4/2002  Suzuki ....................... 709/220
2002/0091416 A1  7/2002  Wassmund et al.
2003/0217193 A1 *  11/2003  Thurston et al. ............ 709/321
2003/0217358 A1 *  11/2003  Thurston et al. ............ 717/174

FOREIGN PATENT DOCUMENTS

GB  2370894 A  *  7/2002
WO  WO 01/61485  8/2001

* cited by examiner

Primary Examiner—Tuan Dam
Assistant Examiner—Andrew Y Chou (57) ABSTRACT

A method of one embodiment of the invention is disclosed that includes providing an image-formation device having firmware with a modular upgrade capability. The method also includes providing a user-accessible manner by which to install further capabilities within the firmware of the image-formation device, via the modular upgrade capability of the firmware.

48 Claims, 4 Drawing Sheets

IMAGE-FORMATION DEVICE FIRMWARE HAVING MODULAR UPGRADE CAPABILITY

BACKGROUND OF THE INVENTION

Typical examples of image-formation devices include printers, such as inkjet and laser printers. Such devices form images on media. For instance, they are used to print hardcopies of word processing documents, digital photographs, and other types of electronic files. Image-formation devices commonly include firmware that stores the executable instructions for controlling the devices.

For instance, the firmware may store the instructions that enable the image-formation devices to convert electronic files received from host devices, such as computers, into formats that the image-formation mechanisms of the devices can understand. The image-formation mechanisms are then able to form images on the media as desired. Examples of image-formation mechanisms include print engines.

Periodically the firmware of image-formation devices may have to be upgraded. Bugs within the firmware may have been found which prevent the devices from operating optimally. The firmware may also be upgraded so that the image-formation devices can support additional features. For instance, the firmware may be upgraded so that the devices are able to support additional printer features or so that the firmware can support additional devices.

Upgrading the firmware of image-formation devices is usually an all-or-nothing affair. A new version of firmware for an image-formation device is obtained, typically by the end user, and overwrites the existing firmware already within the image-formation device. This is accomplished even though typically most of the existing firmware within the image-formation device is unchanged as compared to the new version of firmware.

In addition, image-formation devices typically ship from the manufacturer with a complete version of the firmware. When new devices are being designed, this means that the engineers have to ensure that a complete working firmware has been finished before the devices can be released to distributors and sold to end users. The engineers may thus face serious time pressures to ship complete working firmware.

SUMMARY OF THE INVENTION

A method of one embodiment of the invention includes providing an image-formation device having firmware with a modular upgrade capability. The method also includes providing a user-accessible manner by which to install further capabilities within the firmware of the image-formation device, via the modular upgrade capability of the firmware.

BRIEF DESCRIPTION OF THE DRAWINGS

The drawings referenced herein form a part of the specification. Features shown in the drawing are meant as illustrative of only some embodiments of the invention, and not of all embodiments of the invention, unless explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Modular Firmware Initially without Image-formation Capabilities

Figure 1:
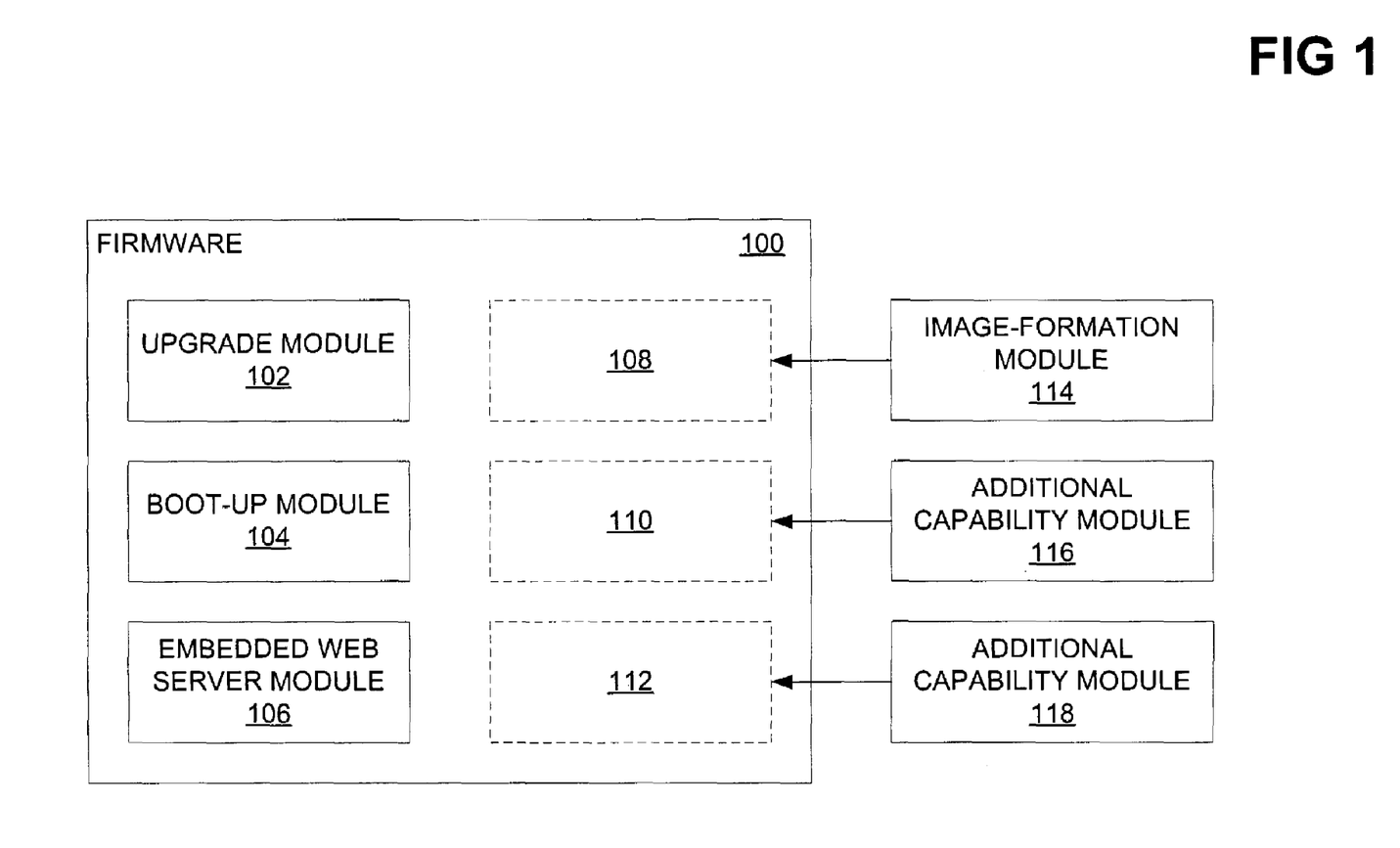
FIG. 1 is a diagram of modular firmware for an image-formation device that initially has no image-formation capabilities, according to an embodiment of the invention.

FIG. 1 shows modular firmware 100 for an image-formation device, according to an embodiment of the invention. The firmware 100 includes executable instructions for controlling the image-formation device, as organized within a number of capability modules, such as the modules 102, 104, and 106. The firmware 100 is a non-volatile memory stored within the image-formation device on a computer-readable medium, such as a semiconductor memory device. The modules 102, 104, and 106, and the empty areas 108, 110, and 112, are depicted as discrete entities within FIG. 1. This is for illustrative clarity, and is not meant to convey that the modules and empty areas are physically separate components within the firmware 100, but rather to convey that they may be logically separate within the firmware 100.

The modular firmware 100 initially has an upgrade module 102, a boot-up module 104, and optionally an embedded web ser module 106. Each of the modules 102 includes executable instructions to provide the image-formation device with a specific capability. The upgrade module 102 enables the firmware 100 to be modularly upgraded, without necessarily erasing or overwriting existing installed modules within the firmware 100. The boot-up module 104 enables the image-formation device to be booted up, such as by initializing any necessary hardware of the image-formation device. The optionally embedded web server module 106 provides a web interface for the image-formation device, so that an end user is able to change settings and perform other operations relative to the image-formation device through a web browsing program installed on a computing device communicatively connected to the image-formation device.

The modular firmware 100 has empty areas 108, 110, and 112 into which additional firmware capability modules 114, 116, and 118 can be installed as an upgrade process via the upgrade module 102. For instance, the firmware 100 initially has no image-formation capability. This means that the image-formation device cannot be used to form images on media, without initially being upgraded with an image-formation module, such as the image-formation module 114. Other, additional capabilities, which may be image-formation capabilities or other types of capabilities, may also be added to the image-formation device through the additional capability modules 116 and 118.

The lack of an initial image-formation capability module within the firmware 100 means that the engineers of the firmware 100 may have additional time to develop such a module. For example, the image-formation device may be released to distributors for purchase by end users with only a minimal amount of functionality, represented by the upgrade, boot-up, and embedded web server modules 102, 104, and 106. While the image-formation device is being released, the engineers are able to continue working on the image-formation module 114. End users are thus able to boot-up their purchased image-formation devices, utilizing the boot-up module 104, but then have to upgrade the firmware 100, via the upgrade module 102, to obtain the image-formation module 114 to actually utilize their devices to form images on media.

Additionally, whereas FIG. 1 depicts the firmware 100 having three empty areas 108, 110, and 112 of identical size, those of ordinary skill within the art can appreciate that there may be more or less of the areas 108, 110, and 112, and which may have different sizes. For instances, there may be a single empty area within the firmware 100 that can accommodate additional capability modules of different sizes until the empty area has been filled. Furthermore, the upgrade capability of the upgrade module 102 may be utilized to install upgraded versions of already installed modules within the firmware 100, such as the modules 102, 104, and 106.

Figure 2:
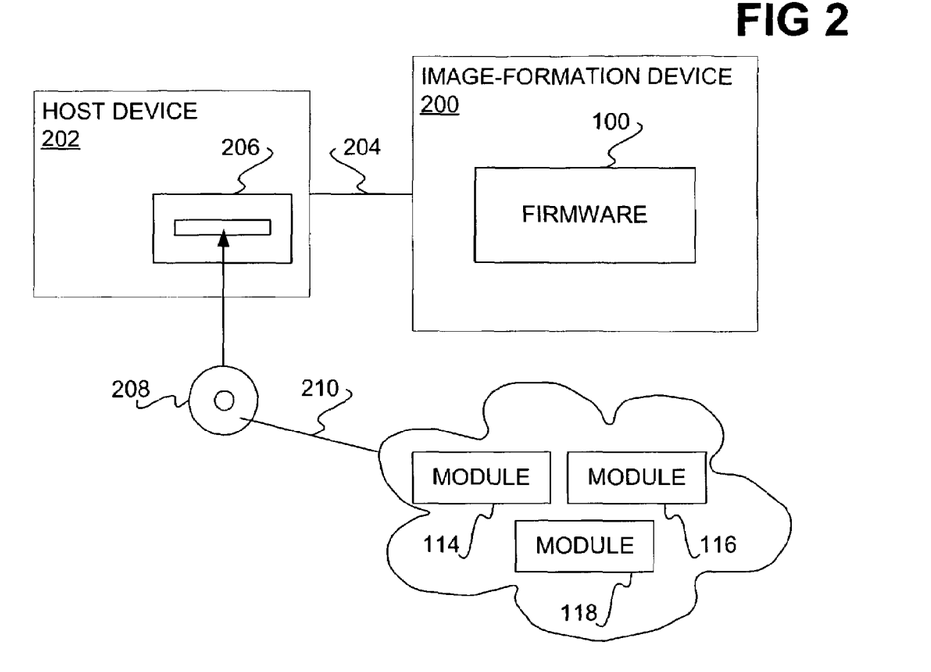
FIG. 2 is a diagram depicting the manner by which the modular firmware of FIG. 1 may be modularly upgraded using an optical disc storing further image-formation device capabilities, according to an embodiment of the invention.

FIG. 2 shows how the firmware 100 of an image-formation device 200 may be modularly upgraded using an optical disc 208, according to an embodiment of the invention. The image-formation device 200 is communicatively connected to a host device 202, as indicated by the line 204. The host device 202 may be a computing device, such as a computer, having an optical disc device 206, such as a CD-ROM drive, a DVD-ROM drive, and so on. The line 204 may represent a direct connection between the devices 200 and 202, such as the image-formation device 200 having a cable directly plugging into the host device 202, or an indirect connection between the devices 200 and 202. For instance, both the devices 200 and 202 may be connected to the same local-area network (LAN), such that they can communicate with one another.

The optical disc 208 may be a CD-ROM, a DVD-ROM, or another type of optical disc or removable storage medium.

The optical disc 208 stores the capability modules 114, 116, and 118, that include at least image-formation capabilities for the image-formation device 200, as indicated by the line 210. That is, the firmware 100, as has been described, does not initially provide for image-formation capabilities for the image-formation device 200, such that the device 200 is initially unable to form images onto media. The optical disc 208 is preferably included with the device 200 when purchased by an end user. Therefore, the manufacturer of the image-formation device 200 can provide the optical disc 208 to the distributor potentially independently of the device 200, requesting that the distributor provide the disc 208 to the end user. The manufacturer can thus ensure that end users are nearly always provided with the latest image-formation capabilities for the image-formation device 200, by releasing updated optical discs, and without having to recall back stock of image-formation devices to individually upgrade.

The end user, after connecting the image-formation device 200 directly or indirectly to the host device 202, turns on the image-formation device 200 to boot up the device 200. The end user may use a web server program to access the image-formation device 200 via the embedded web server module 106 of FIG. 1 of the firmware 100. Alternatively, the end user may install a program stored on the optical disc 208 onto the host device 202 to access the image-formation device 200. Ultimately, the end user, through the upgrade module 102 of FIG. 1 of the firmware 100 is able to select from the modules 114, 116, and 118 stored on the optical disc 208.

That is, the end user may not have to install all of the modules 114, 116, and 118, but rather can pick and choose from among them, depending on the desired capabilities. For instance, the end user may not have a duplexing accessory installed on the image-formation device 200, such that he or she would not need to install any of the modules 114, 116, and 118 that enable the image-formation device 200 to take of advantage of duplexing. The upgrade module 102 of FIG. 1 of the firmware 100 retrieves or acquires the user-selected of the modules 114, 116, 118 from the optical disc 208, and installs them within the firmware 100 of the image-formation device 200. Once the end user has performed this initial upgrade process, installing at least one image-formation capability module within the firmware 100, the user is able to then utilize the image-formation device 200 to form images on media.

Figure 3:
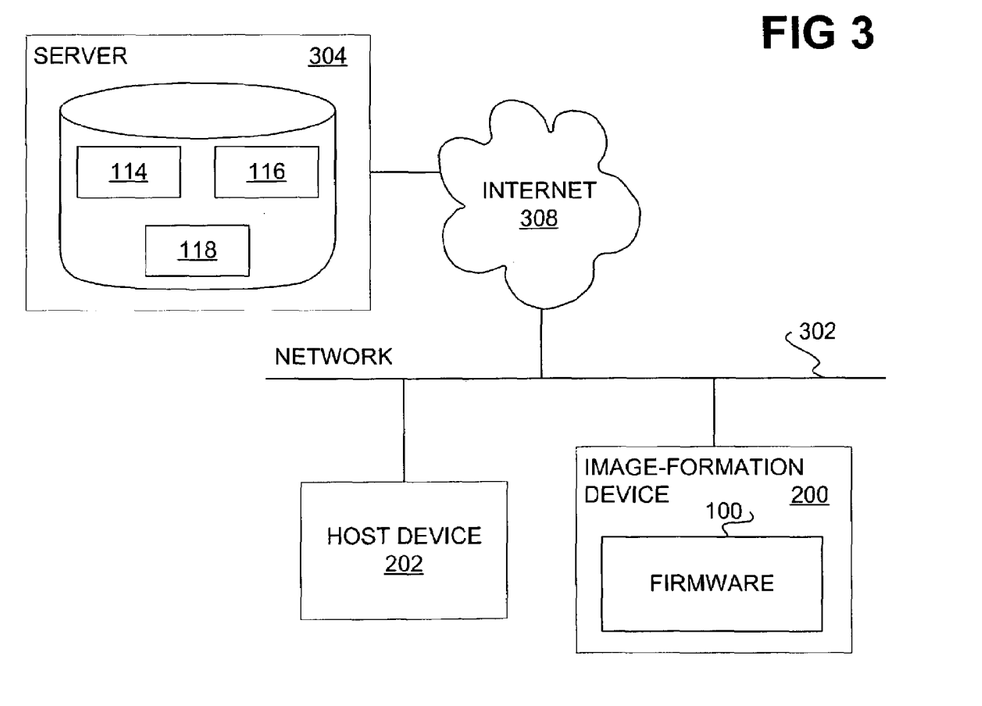
FIG. 3 is a diagram depicting the manner by which the modular firmware of FIG. 1 may be modularly upgraded indirectly over a network through a host device, such as a computing device like a computer, according to an embodiment of the invention.

FIG. 3 shows how the firmware 100 of the image-formation device 200 may be modularly upgraded indirectly over a network such as the Internet 308, according to an embodiment of the invention. The image-formation device 200 is connected to a network 302, as is the host device 202. The network 302 is connected to the Internet 308, as is a server 304. The server 304 has a storage device 306 that has stored thereon the additional capability modules 114, 116, and 118 for the firmware 100 of the image-formation device 200. The server 304 may be maintained, for instance, by the manufacturer of the image-formation device 200, such that the server 304 preferably has stored on its storage device 306 the most recent versions of the firmware modules 114, 116, and 118.

In the embodiment of FIG. 3, the end user employs a web browsing program on the host device 202 to access the embedded web server provided by the embedded web server module 106 of FIG. 1 of the firmware 100, or a previously installed specific computer program to otherwise access the image-formation device 200. The host device 202 is thus indirectly used to obtain access to the server 304 over the Internet 308, through the network 302. The end user is able to select which of the additional capability modules 114, 116, and 118 that are desired to be installed within the firmware 100. Once selected, the upgrade module 102 of FIG. 1 of the firmware 100 retrieves, or acquires, the selected of the modules 114, 116, and 118, from the server 304, and installs them within the firmware 100. As before, where the firmware 100 does not have any image-formation capability modules, such upgrading of the firmware 100 enables the end user to use the image-formation device 200 to form images onto media, and in some cases adds finishing capabilities.

Figure 4:
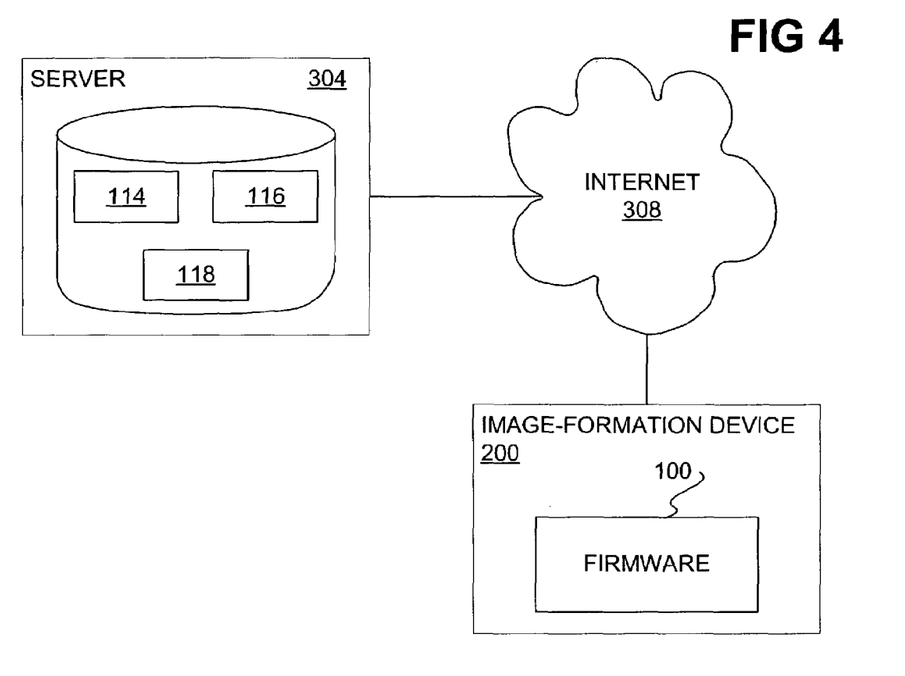
FIG. 4 is a diagram depicting the manner by which the modular firmware of FIG. 1 may be modularly upgraded directly over a network, according to an embodiment of the invention.

FIG. 4 shows how the firmware 100 of the image-formation device 200 may be modularly upgraded directly over a network such as the Internet 308, according to an embodiment of the invention. The image-formation device 200 is communicatively connected to the Internet 308, as is the server 304. In the embodiment of FIG. 4, the image-formation device 200 may automatically, upon booting via the boot-up module 104 of FIG. 1 of the firmware 100, connect to the server 304. The upgrade module 102 of FIG. 1 of the firmware 100 may then acquire and install one or more of the modules 114, 116, and 118 within the firmware 100 so that, for instance, image-formation capability is provided for the image-formation device 200. Alternatively, the end user may be able to use a display of the image-formation device 200, such as an integrated liquid-crystal display, to select the desired of the modules 114, 116, and 118, such that the upgrade module 102 acquires and installs the selected modules.

Image-formation Device

Figure 5:
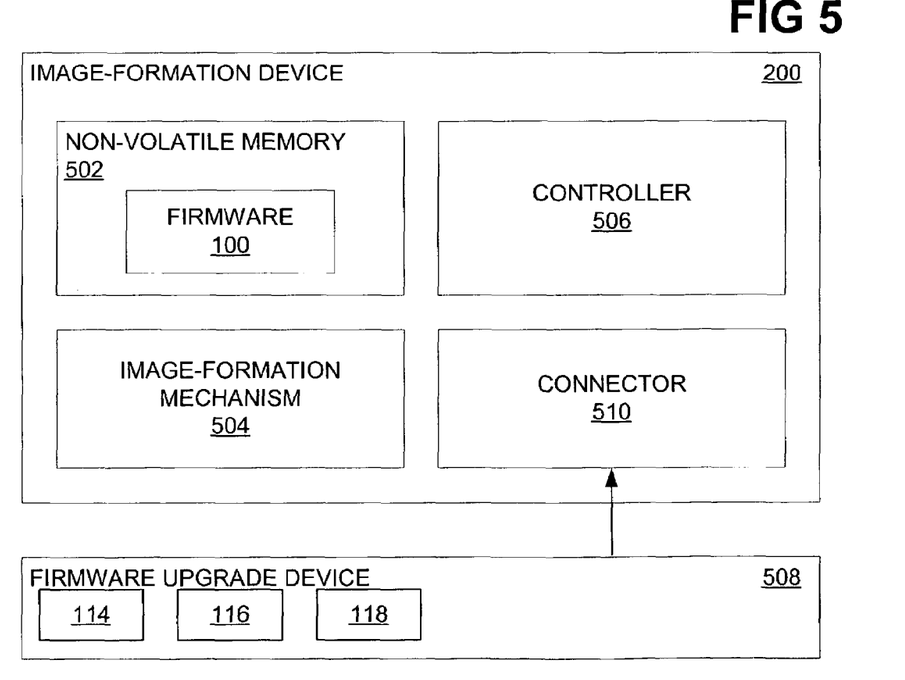
FIG. 5 is a block diagram of an image-formation device having modular firmware initially without image-formation capabilities, according to an embodiment of the invention.

FIG. 5 shows a block diagram of the image-formation device 200, according to an embodiment of the invention. The image-formation device 200 is depicted in FIG. 5 as including a non-volatile memory 502, an image-formation mechanism 504, a controller 506 operatively coupled to the memory 502, and the mechanism 504. The device 200 may optionally include a connector 510 into which an external firmware upgrade device 508 can be connected. As can be appreciated by those of ordinary skill within the art, the device 200 may include components in addition to and/or in lieu of those depicted in FIG. 5. The non-volatile memory 502 may be a semiconductor memory, such as a flash memory, a magnetic memory, such as a disk drive, or another type of memory. More generally, the memory 502 is a computer-readable and writable medium, in that it can be both written to and read from by a computing mechanism such as the controller 506. The memory 502 is non-volatile in that the memory 502 retains its contents when power is no longer supplied to the memory 502. The memory 502 stores the modular firmware 100, including the modules 102, 104, and 106, as has been described in the preceding section of the detailed description.

The image-formation mechanism 504 includes the hardware and other components necessary for the image-formation device 200 to form images onto the media. For instance, the mechanism 504 may be or include a laser-printing mechanism, or print engine, an inkjet-printing mechanism, or print engine, or another type of printing mechanism or print engine. Thus, the image-formation device 200 may be a laser-printing device, such as a laser printer, an inkjet-printing device, such as an inkjet printer, or another type of printing device. The controller 506 includes the hardware necessary to execute the modular firmware 100 within the non-volatile memory 502 to control the image-formation mechanism 504, so that it can cause the image-formation mechanism 504 to form images on media as desired, and finish image, or print, jobs where such capability is available. For instance, the controller 506 may include a processor that is able to retrieve and execute the instructions organized as modules within the modular firmware 100.

The controller 506 may be initially unable to cause the image-formation mechanism 504 to form images onto media, due to the lack of image-formation capability modules within the modular firmware 100. For instance, the firmware 100 may initially include only the upgrade and boot-up modules 102 and 104 of FIG. 1, and optionally the embedded web server module 106 of FIG. 1. The end user may thus have to modularly upgrade the firmware 100 via the upgrade module 102, after booting up the image-formation device 200 utilizing the boot-up module 104, to acquire and install the image-formation module 114 of FIG. 1, enabling the controller 506 to cause the mechanism 504 to form images onto media. Preferably, the upgrade module 102 is able to acquire and install other modules, such as the modules 114, 116, and 118 of FIG. 1, without having to reacquire or reinstall any already installed modules within the firmware 100.

In one embodiment, upgrading of the firmware 100 of the non-volatile memory 502 of the image-formation device 200 is accomplished by having a user connect the firmware upgrade device 508 into the connector 510. The firmware upgrade device 508 is more generally a computer-readable medium, such as a semiconductor memory like a flash memory. The firmware upgrade device 508 may store the modules 114, 116, and 118 of FIG. 1, as well as other image-formation modules. Thus, the upgrade module 102 of the firmware 100 is able to acquire and install these other modules directly from the firmware upgrade device 508, without having to have the image-formation device connected to a host device, such as the host device 202 of FIG. 2, or to a network, such as the Internet 308 of FIG. 3. Once the firmware 100 has been upgraded with the modules stored in the firmware upgrade device 508, the device 508 may be removed from the connector 510 of the image-formation device 200.

Methods

Figure 6:
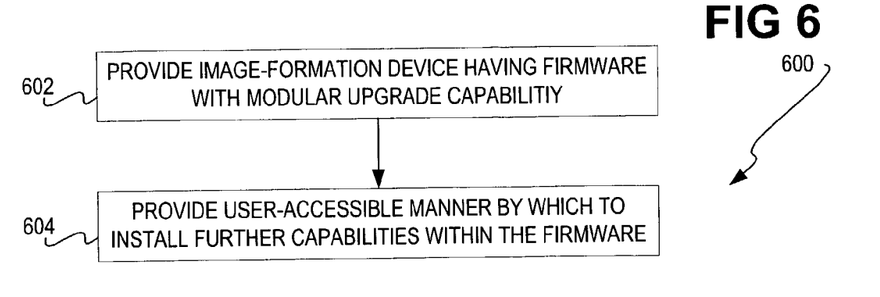
FIG. 6 is a flowchart of a method of manufacture of an image-formation device having modular firmware initially without image-formation capabilities, according to an embodiment of the invention.

FIG. 6 shows a method of manufacture 600 for the image-formation device 200, according to an embodiment of the invention. The image-formation device 200 is provided with the modular firmware 100 that has at least a modular upgrade capability, via the upgrade module 102 (602). Providing the image-formation device 200 may include providing a printer, such as a laser or an inkjet printer. The firmware 100 also includes a boot-up capability, via the boot-up module 104, so that the image-formation device 200 is able to boot up initially. The firmware 100 may also include an embedded web server capability, via the embedded web server module 106, through which the modular upgrade capability is accessible. The firmware 100 may not include any actual image-formation capabilities, such that the device 200 cannot initially be used to form images onto media.

A user-accessible manner by which to install further capabilities within the modular firmware 100, via the modular upgrade capability of the firmware 100, is also provided (604). For instance, the user-accessible manner may be accessible by the user through the embedded web server capability. The firmware 100 is preferably upgradeable with further capabilities without necessarily having to reinstall existing firmware capabilities of the image-formation device 200. In one embodiment, the user-accessible manner includes providing the optical disc 208 with the image-formation device 200, on which the further firmware capabilities are stored, which may be stored as the capability modules 114, 116, and 118. The modules 114, 116, and 118 are selectively transferred from the disc 208 to the device 200 through the modular upgrade capability of the firmware 100, and installed thereby within the firmware 100.

In another embodiment, the user-accessible manner includes providing access to the server 304 over the Internet 308, or another network, with which the image-formation device 200 is able to communicate. The server 304 stores the further firmware capabilities, which again may be stored as the capability modules 114, 116, and 118. The modules 114, 116, and 118, are selectively transferred from the server 304, over the Internet 308, and to the device 200, through the modular upgrade capability of the firmware 100, and installed thereby within the firmware 100. In this way, image-formation capabilities may be installed within the modular firmware 100 of the image-formation device 200, so that the end user is able to use the image-formation device 200 to form images on media.

Figure 7:
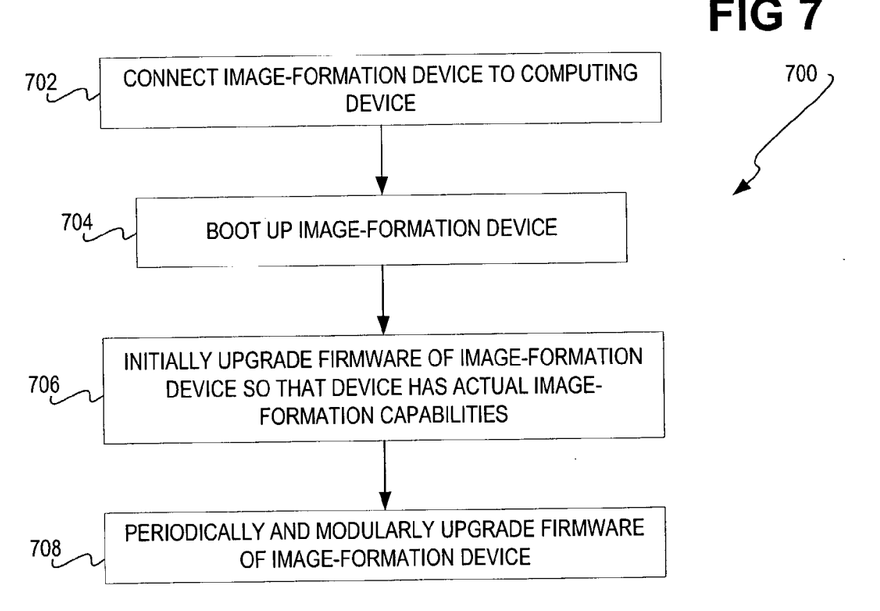
FIG. 7 is a flowchart of a method of use of an image-formation device having modular firmware initially without image-formation capabilities, according to an embodiment of the invention.

FIG. 7 shows a method of use 700 for the image-formation device 200, according to an embodiment of the invention. The image-formation device 200 is initially connected to a computing device, such as the host device 202 (702). The connection may be a direct connection between the devices 200 and 202, such as by a cable directly connecting them, or an indirect connection, such as by connecting both the devices 200 and 202 to the same network 302. The image-formation device 200 is then booted up (704). For instance, an inkjet, laser, or other type of printer may be turned on by the end user, and the end user may wait for the printer to initialize. The image-formation device 200 may not initially include any image-formation capabilities, such that after being booted up, the device 200 is nevertheless unable to form images on media.

Therefore, the modular firmware 100 of the image-formation device 200 is initially upgraded so that the device 200 has actual image-formation capabilities (706). This can include accessing the upgrade module 102 of the firmware 100 through an embedded web server module 106 of the firmware 100 through a web-browsing program on the host device 202. This can alternatively include accessing the upgrade module 102 through a previously installed program on the host device 202 designed to communicate with the image-formation device 200 for this purpose.

As before, the optical disc 208 may be inserted into the optical disc device 206 of the host device 202, to retrieve the modular firmware capabilities stored as the capability modules 114, 116, and 118 on the optical disc 208. Alternatively, the server 304 may be accessed directly from the image-formation device 200, or indirectly through the host device 202, over the Internet 308, or another network, to retrieve the modular firmware capabilities stored as the capability modules 114, 116, and 118 on the server 304. Finally, the modular firmware 100 of the image-formation device 200 may be periodically modularly upgraded (708), so that new or replacement capabilities may similarly be retrieved and installed. For instance, users may be able to sign into a web server available over the Internet, and request that notice of the latest available firmware upgrades and additional image-formation capabilities added be sent to them.

Figure 8:
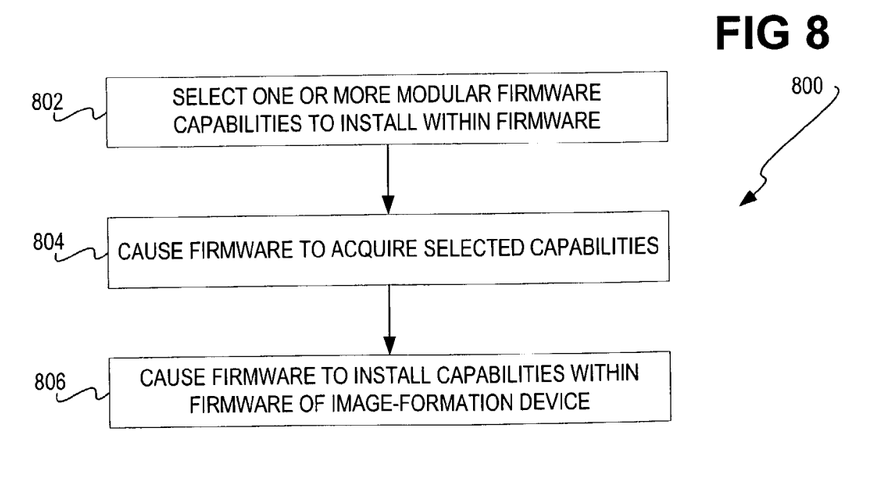
FIG. 8 is a flowchart of a specific method for modularly upgrading the modular firmware of an image-formation device without affecting any currently installed capability modules within the firmware, according to an embodiment of the invention.

FIG. 8 shows a method 800 for upgrading the firmware 100 of the image-formation device 200, according to an embodiment of the invention. For instance, the method 800 may be performed within 706 and/or 708 of the method 700 of FIG. 7. First, one or more desired modular firmware capabilities are selected to install within the modular firmware 100 (802). The capabilities may be individually implemented as the capability modules 114, 116, and 118, and may in particular include an image-formation capability implemented as the capability module 114. The names of all the available capabilities may be initially retrieved from the optical disc 208 or from the server 304 to display to the user on the host device 202 or on the image-formation device 200, so that the user can select from the available capabilities.

The selected capabilities are then caused to be acquired by the firmware 100 of the image-formation device 200 (804). For instance, the user may indicate to the upgrade module 102 of the firmware 100 to transfer those of the capability modules 114, 116, and 118 corresponding to the selected capabilities from the optical disc 208. The user may alternatively indicate to the upgrade module 102 to download those of the capability modules 114, 116, and 118 corresponding to the selected capabilities from the server 304 over the Internet 308. Finally, the firmware 100 is caused to install the capabilities that have been selected and acquired within the firmware 100 of the image-formation device 200 (806). For instance, the upgrade module 102 may install the acquired of the modules 114, 116, and 118 within the firmware 100, without necessarily reacquiring or reinstalling already installed modules within the firmware 100.

In one embodiment, the method 800 can be performed by connecting a small computer-readable medium into a corresponding connector of the image-formation device 200, such that the user implicitly or explicitly selects in 802 the modular firmware upgrade capabilities stored on the computer-readable medium for upgrading the firmware 100. For instance, the medium may be the firmware upgrade device 508 of FIG. 5, and the connector may be the connector 510 of FIG. 1. The firmware 100 of the image-formation device 200 acquires these selected capabilities from the computer-readable medium in 804 while the medium is connected to the image-formation device, and then installs the capabilities from the medium in 806, as before. An advantage of this approach is that the image-formation device 200 can have its firmware 100 upgraded without being connected to any other device, such as a host device, or a network.

Furthermore, the methods 700 of FIG. 7 and 800 of FIG. 8 may be performed for more than one image-formation device at the same time. For instance, a group of image-formation devices, such as network printers commonly connected to the same network, may be logically organized through a computer program running on a computer also connected to the network. A network administrator can then upgrade the group of image-formation devices with the same upgrade module 102, at the same time, decreasing the effort needed to upgraded the devices. For example, the periodic and modular firmware upgrading performed in 708 of the method 700 of FIG. 7 may be performed on the group of image-formation devices.

CONCLUSION

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

I claim:

1. A method comprising:

providing an image-formation device having firmware with a modular upgrade capability, such that the firmware is capable of being modularly upgraded without necessarily erasing or overwriting existing installed modules within the firmware, wherein the image-formation device is initially provided having the firmware with an upgrade module providing the modular upgrade capability of the firmware but with no image-formation module such that the firmware initially has no image-formation capabilities; and, providing a user-accessible manner by which to install further capabilities within the firmware of the image-formation device via the modular upgrade capability of the firmware.

2. The method of claim 1, wherein providing the image-formation device having the firmware comprises further providing the image-formation device having the firmware with a boot-up capability so that the image-formation device is initially able to boot up.

3. The method of claim 1, wherein providing the image-formation device having the firmware with the modular upgrade capability comprises further providing the image-formation device having the firmware with an embedded web server capability through which the modular upgrade capability is accessible.

4. The method of claim 3, wherein providing the user-accessible manner by which to install the further capabilities within the firmware of the image-formation device comprises providing the user-accessible manner by which to install the further capabilities within the firmware of the image-formation device via the modular upgrade capability as accessed through the embedded web server capability.

5. The method of claim 1, wherein providing the image-formation device comprises providing a printer.

6. The method of claim 1, wherein providing the user-accessible manner by which to install the farther firmware capabilities within the image-formation device comprises providing the user-accessible manner by which to install the farther firmware capabilities within the image-formation device without having to reinstall existing firmware capabilities of the image-formation device.

7. The method of claim 1, wherein providing the user-accessible manner by which to install the farther firmware capabilities within the image-formation device comprises providing an optical disc with the image-formation device on which the farther firmware capabilities are stored and that are accessible through the modular upgrade capability of the firmware.

8. The method of claim 1, wherein providing the user-accessible manner by which to install the farther firmware capabilities within the image-formation device comprises providing a server over a network with which the image-formation device is able to communicate and having the farther firmware capabilities that are accessible through the modular upgrade capability of the firmware.

9. A method comprising:

booting up an image-formation device, wherein the image-formation device is initially provided having firmware with an upgrade module providing modular upgrade capability but with no image-formation module such that the firmware initially has no image-formation capabilities; and, initially upgrading the firmware of the image-formation device so that the image-formation device has the image-formation capabilities, wherein the firmware is capable of being modularly upgraded without necessarily erasing or overwriting existing installed modules within the firmware.

10. The method of claim 9, further comprising periodically and modularly upgrading the firmware of the image-formation device.

11. The method of claim 10, wherein periodically and modularly upgrading the firmware of the image-formation device comprises:

selecting one or more of the modular firmware capabilities to install within the firmware of the image-formation device;

causing the firmware to acquire the one or more of the modular firmware capabilities to the image-formation device; and, causing the firmware to install the one or more of the modular firmware capabilities within the firmware of the image-formation device.

12. The method of claim 10, wherein periodically and modularly upgrading the firmware of the image-formation device comprises periodically and modularly upgrading firmware of each of a group of image-formation devices, including the firmware of the image-formation device.

13. The method of claim 10, wherein periodically and modularly upgrading the firmware of the image-formation device comprises inserting a computer-readable medium having modular firmware capabilities into the image-formation device.

14. The method of claim 13, wherein periodically and modularly upgrading the firmware of the image-formation device further comprises causing the firmware to install the modular firmware capabilities stored in the computer-readable medium.

15. The method of claim 9, further initially comprising connecting the image-formation device to a computing device.

16. The method of claim 15, wherein connecting the image-formation device to the computing device comprises one of indirectly and indirectly connecting the image-formation device to the computing device.

17. The method of claim 9, wherein booting up the image-formation device comprises booting up a printer.

18. The method of claim 9, wherein booting up the image-formation device comprises turning on the image-formation device and waiting for the image-formation device to initialize.

19. The method of claim 9, wherein initially upgrading the firmware of the image-formation device comprises accessing the firmware through a web-browsing program on a computing device connected to the image-formation device.

20. The method of claim 9, wherein initially upgrading the firmware of the image-formation device comprises accessing the firmware through a previously installed program on a computing device connected to the image-formation device and designed to communicate with the image-formation device.

21. The method of claim 9, wherein initially upgrading the firmware of the image-formation device comprises inserting an optical disc into an optical disc device of a computing device connected to the image-formation device and having stored thereon modular firmware capabilities including an actual image-formation capability.

22. The method of claim 21, where initially upgrading the firmware of the image-formation device further comprises:

selecting one or more of the modular firmware capabilities to install within the firmware of the image-formation device;

causing the firmware to transfer the one or more of the modular firmware capabilities to the image-formation device; and, causing the firmware to install the one or more of the modular firmware capabilities within the firmware of the image-formation device.

23. The method of claim 9, wherein initially upgrading the firmware of the image-formation device comprises accessing a server over a network having modular firmware capabilities including an actual image-formation capability.

24. The method of claim 23, wherein accessing the server over the network comprises accessing the server through the image-formation device.

25. The method of claim 23, wherein accessing the server over the network comprises accessing the server through a computing device connected to the image-formation device.

26. The method of claim 23, wherein initially upgrading the firmware of the image-formation device further comprises:

selecting one or more of the modular firmware capabilities to install within the firmware of the image-formation device;

causing the firmware to download the one or more of the modular firmware capabilities to the image-formation device; and, causing the firmware to install the one or more of the modular firmware capabilities within the firmware of the image-formation device.

27. The method of claim 9, wherein initially upgrading the firmware of the image-formation device comprises inserting a computer-readable medium having modular firmware capabilities into the image-formation device.

28. The method of claim 27, wherein initially upgrading the firmware of the image-formation device farther comprises causing the firmware to install the modular firmware capabilities stored in the computer-readable medium.

29. An image-formation device comprising:

a non-volatile memory capable of storing modular firmware having a firmware upgrade module, wherein the modular firmware is capable of being modularly upgraded without necessarily erasing or overwriting existing installed modules within the firmware, wherein the image-formation device is initially provided having the modular firmware with the firmware upgrade module but with no image-formation module such that the modular firmware initially has no image-formation capabilities;

an image-formation mechanism capable of forming an image onto media; and, a controller operatively coupled to the non-volatile memory and to the image-formation mechanism and capable of executing the image-formation module of the modular firmware to cause the image-formation mechanism to form the image onto the media.

30. The image-forming device of claim 29, wherein the modular firmware further has a boot-up module.

31. The image-forming device of claim 29, wherein the modular firmware further has a embedded web server module.

32. The image-forming device of claim 29, wherein the firmware upgrade module is capable of acquiring and installing other modules within the modular firmware without reacquiring and reinstalling any already installed modules within the modular firmware.

33. The image-forming device of claim 29, wherein the firmware upgrade module is capable of initially acquiring and installing at least one image-formation module within the modular firmware so that the controller is able to cause the image-formation mechanism to form the image onto the media.

34. The image-forming device of claim 29, wherein the image-formation mechanism is a laser-printing mechanism and the image-formation device is a laser-printing device.

35. The image-forming device of claim 29, wherein the controller comprises a processor capable of executing modules of the modular firmware.

36. An image-formation device comprising:

a non-volatile memory capable of storing firmware, such that the firmware is capable of being modularly upgraded without necessarily erasing or overwriting existing installed modules within the firmware, wherein the image-formation device is initially provided having the firmware with a firmware upgrade module providing modular upgrade capability but with no image-formation module such that the firmware initially has no image-formation capabilities;

an image-formation mechanism capable of forming an image onto media;

a controller operatively coupled to the non-volatile memory and to the image-formation mechanism and capable of executing the image-formation module of the firmware to cause the image-formation mechanism to form the image onto the media; and, means for initially acquiring and installing the image-formation module within the firmware so that the controller is able to cause the image-formation mechanism to form the image onto the media.

37. The image-formation device of claim 36, wherein the means is further for subsequently acquiring and installing other modules within the firmware without reacquiring and reinstalling any already installed modules within the firmware.

38. The image-formation device of claim 36, wherein the image-formation mechanism is a laser-printing mechanism and the image-formation device is a laser-printing device.

39. A computer-readable and writable medium having modular firmware for an image-formation device stored thereon comprising a firmware upgrade module programmed to at least initially acquire and install at least one image-formation module within the modular firmware so that the image-formation device is able to form images onto media, the modular firmware initially having no image-formation modules, wherein the modular firmware is capable of being modularly upgraded without necessarily erasing or overwriting existing installed modules within the modular firmware, and wherein the image-formation device is initially provided having the firmware with the firmware upgrade module but without the at least one image-formulation module such that the firmware initially has no image-formation capabilities.

40. The computer-readable and writable medium of claim 39, the modular firmware further comprising a boot-up module.

41. The computer-readable and writable medium of claim 39, the modular firmware further comprising an embedded web server module.

42. The computer-readable and writable medium of claim 39, wherein the medium is a semiconductor memory.

43. The computer-readable and writable medium of claim 42, wherein the semiconductor memory is a flash memory.

44. The computer-readable and writable medium of claim 39, wherein the medium is a magnetic memory.

45. The computer-readable and writable medium of claim 44, wherein the medium is a hard disk drive.

46. A computer-readable medium connectable to a connector of an image-formation device and having stored thereon at least one image-formation module providing at least one corresponding modular firmware capability, the module acquirable by modular firmware of the image-formation device while the medium is connected to the connector of the image-formation device for installation within the image-formation device, wherein the modular firmware is capable of being modularly upgraded without necessarily erasing or overwriting existing installed modules within the modular firmware, and wherein the image-formation device is initially provided having the modular firmware with a firmware upgrade module but without the at least one image-formulation module such that the firmware initially has no image-formation capabilities.

47. The computer-readable medium of claim 46, wherein the medium is a semiconductor memory.

48. The computer-readable medium of claim 47, wherein the semiconductor memory is a flash memory.

* * * * *

UNITED STATES PATENT AND TRADEMARK OFFICE
CERTIFICATE OF CORRECTION

PATENT NO.         : 7,249,353 B2                                    Page 1 of 1
APPLICATION NO.    : 10/420038
DATED              : July 24, 2007
INVENTOR(S)        : Maria F. Zarco It is certified that error appears in the above-identified patent and that said Letters Patent is hereby corrected as shown below:

In column 9, line 41, in Claim 6, delete "farther" and insert -- further --, therefor.

In column 9, line 44, in Claim 6, delete "farther" and insert -- further --, therefor.

In column 9, line 48, in Claim 7, delete "farther" and insert -- further --, therefor.

In column 9, line 51, in Claim 7, delete "farther" and insert -- further --, therefor.

In column 9, line 55, in Claim 8, delete "farther" and insert -- further --, therefor.

In column 9, line 59, in Claim 8, delete "farther" and insert -- further --, therefor.

In column 11, line 37, in Claim 28, delete "farther" and insert -- further --, therefor.

Signed and Sealed this

Eleventh Day of August, 2009

David J. Kappos
*Director of the United States Patent and Trademark Office*